United States Patent
Kuhn et al.

(10) Patent No.: US 11,293,341 B2
(45) Date of Patent: Apr. 5, 2022

(54) INTERNAL COMBUSTION ENGINE FOR A MOTOR VEHICLE, MORE PARTICULARLY FOR A MOTOR CAR, AND METHOD FOR OPERATING SUCH AN INTERNAL COMBUSTION ENGINE

(71) Applicant: Daimler AG, Stuttgart (DE)

(72) Inventors: Thomas Kuhn, Stuttgart (DE); Nils Brinkert, Ludwigsburg (DE); Rene Ernst, Leimersheim (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 17/055,913

(22) PCT Filed: May 14, 2019

(86) PCT No.: PCT/EP2019/062370
§ 371 (c)(1),
(2) Date: Nov. 16, 2020

(87) PCT Pub. No.: WO2019/219701
PCT Pub. Date: Nov. 21, 2019

(65) Prior Publication Data
US 2021/0189948 A1    Jun. 24, 2021

(30) Foreign Application Priority Data

May 17, 2018  (DE) .................... 10 2018 003 961.8

(51) Int. Cl.
*F02B 37/18*    (2006.01)
*F01N 3/02*     (2006.01)
(Continued)

(52) U.S. Cl.
CPC ............ *F02B 37/183* (2013.01); *F01N 3/021* (2013.01); *F01N 3/101* (2013.01); *F01N 3/24* (2013.01); *F02B 39/10* (2013.01)

(58) Field of Classification Search
CPC ........ F02B 37/183; F02B 39/10; F01N 3/021; F01N 3/101; F01N 3/24; F01N 3/10;
(Continued)

(56) References Cited

U.S. PATENT DOCUMENTS

| 8,516,814 | B2* | 8/2013 | Okada ................. F02D 41/0007 60/602 |
| 2003/0074899 | A1* | 4/2003 | Yamaguchi ........... F01N 3/2006 60/612 |

(Continued)

FOREIGN PATENT DOCUMENTS

| CN | 102187068 A | 9/2011 |
| CN | 103670675 A | 3/2014 |

(Continued)

OTHER PUBLICATIONS

PCT/EP2019/062370, International Search Report dated Jun. 26, 2019 (Two (2) pages).

(Continued)

*Primary Examiner* — Audrey B. Walter
*Assistant Examiner* — Dapinder Singh
(74) *Attorney, Agent, or Firm* — Crowell & Moring LLP

(57) ABSTRACT

An internal combustion engine for a motor vehicle includes an exhaust system through which exhaust gas can flow and in which a first exhaust gas aftertreatment element is disposed. An exhaust gas turbocharger has a turbine and the turbine has a turbine wheel which is disposed upstream of the first exhaust gas aftertreatment element. A bypass line bypasses the turbine wheel and via the bypass line at least part of the exhaust gas can bypass the turbine wheel. The bypass line also bypasses the first exhaust gas aftertreatment element. The bypass line is fluidically connected to the exhaust system at a branch point disposed upstream of the turbine wheel and upstream of the first exhaust gas after- (Continued)

treatment element. The bypass line is fluidically connected to the exhaust system at a discharge point disposed downstream of the turbine wheel and downstream of the first exhaust gas aftertreatment element.

8 Claims, 3 Drawing Sheets

(51) Int. Cl.
*F01N 3/10* (2006.01)
*F01N 3/24* (2006.01)
*F02B 39/10* (2006.01)
*F01N 3/021* (2006.01)

(58) Field of Classification Search
CPC ............... F01N 3/2053; F01N 2240/36; F01N 2410/06; F01N 2590/11; Y02T 10/12; Y02A 50/20
See application file for complete search history.

(56) References Cited

U.S. PATENT DOCUMENTS

| | | | |
|---|---|---|---|
| 2011/0131978 A1 | 6/2011 | Okada | |
| 2011/0271673 A1* | 11/2011 | Koenigsegg | F02B 37/18 60/602 |
| 2014/0060006 A1 | 3/2014 | Ruona et al. | |
| 2015/0107228 A1* | 4/2015 | Klingmann | B01J 23/462 60/274 |
| 2018/0058287 A1 | 3/2018 | Zhang | |
| 2019/0120180 A1* | 4/2019 | Martin | F01N 3/0238 |

FOREIGN PATENT DOCUMENTS

| | | |
|---|---|---|
| CN | 107795357 A | 3/2018 |
| DE | 10 2007 017 777 A1 | 10/2008 |
| DE | 10 2011 005 654 A1 | 9/2012 |
| DE | 20 2015 103 035 U1 | 7/2015 |
| DE | 10 2015 208 991 A1 | 11/2016 |
| EP | 2 385 231 A2 | 11/2011 |
| JP | 2016-11632 A | 1/2016 |

OTHER PUBLICATIONS

Chinese-language Office Action issued in Chinese Application No. 201980032767.3 dated Nov. 3, 2021 with English translation (12 pages).

\* cited by examiner

INTERNAL COMBUSTION ENGINE FOR A MOTOR VEHICLE, MORE PARTICULARLY FOR A MOTOR CAR, AND METHOD FOR OPERATING SUCH AN INTERNAL COMBUSTION ENGINE

BACKGROUND AND SUMMARY OF THE INVENTION

The invention relates to an internal combustion engine for a motor vehicle, in particular for an automobile. Furthermore, the invention relates to a method for operating such an internal combustion engine.

Such an internal combustion engine for a motor vehicle and such a method for operating such an internal combustion engine are already known from JP 2016/11632 A. The internal combustion engine comprises an exhaust system through which the exhaust gas from the internal combustion engine can flow and in which at least one exhaust gas aftertreatment element for the aftertreatment of the exhaust gas is arranged. Moreover, the internal combustion engine comprises at least one exhaust gas turbocharger, which has a turbine and a compressor arranged in the exhaust system. The turbine comprises a turbine wheel which can be driven by the exhaust gas and is arranged upstream of the at least one exhaust gas aftertreatment element. The compressor comprises a compressor wheel which can be driven by the turbine wheel and by means of which air, which is to be supplied to at least one combustion chamber of the internal combustion engine, can be compressed. In addition, the internal combustion engine comprises at least one electric machine, by means of which at least the turbine wheel can be driven electrically or by an electric engine. Furthermore, a bypass device is provided, which has at least one bypass line. The bypass line bypasses the turbine wheel, such that the turbine wheel can be bypassed via the bypass line at least by part of the exhaust gas flowing through the exhaust system. This means that the exhaust gas flowing through the exhaust system bypasses the turbine wheel and thus does not drive the turbine wheel. In other words, the turbine wheel is not driven by the exhaust gas flowing through the bypass line.

Furthermore, DE 10 2007 017 777 A1 discloses a turbocharger arrangement for a motor vehicle, having at least one turbocharger stage which has a turbine and a compressor which are mechanically decoupled from each other. In addition, a charged internal combustion engine is known from DE 10 2015 208 991 A1.

The object of the present invention is to develop an internal combustion engine and a method of the type mentioned above in such a way that a particularly low-emission operation of the internal combustion engine can be implemented.

In order to develop an internal combustion engine of the type specified herein in such a way that a particularly low-emission operation of the internal combustion engine can be implemented, it is provided in accordance with the invention that the bypass line also bypasses the at least one exhaust gas aftertreatment element such that the at least one exhaust gas aftertreatment element can also be bypassed at least by part of the exhaust gas. A valve arrangement is thus arranged in the bypass line, by means of which a quantity of the exhaust gas flowing through the bypass line and thereby bypassing the turbine wheel and the at least one exhaust gas aftertreatment element can be adjusted.

The at least one exhaust gas aftertreatment element is preferably an exhaust gas aftertreatment element close to the engine, which is arranged close to the combustion chamber. The at least one exhaust gas aftertreatment element can have exactly one exhaust gas aftertreatment component for the aftertreatment of the exhaust gas, or the at least one exhaust gas aftertreatment element is an exhaust gas aftertreatment group which has several exhaust gas aftertreatment components for the aftertreatment of the exhaust gas. In particular, it is conceivable that the at least one exhaust gas aftertreatment element has at least or exactly one catalytic converter, in particular a three-way catalytic converter. Alternatively or additionally, it is conceivable that the at least one exhaust gas aftertreatment element is the first exhaust gas aftertreatment element of the internal combustion engine arranged downstream of the combustion chamber in the exhaust system and designed for the aftertreatment of the exhaust gas. Preferably, the internal combustion engine is designed as a petrol engine. It is also conceivable that the motor vehicle is designed as a hybrid vehicle.

Due to the fact that the exhaust gas flowing through the bypass line can bypass not only the turbine wheel but also the at least one exhaust gas aftertreatment element and due to the fact that quantity of the exhaust gas flowing through the bypass line can be adjusted as required by means of the valve element, poor efficiency of the turbine and thus of the exhaust gas turbocharger can be adjusted at least temporarily, in particular in its function as a compressor. Such a poor efficiency is advantageous, however, since a particularly high amount of energy dissipates. This results in a large amount of heat loss, which can be used to increase the temperature or to heat the at least one exhaust gas aftertreatment element and/or the at least one further exhaust gas aftertreatment element which may be provided and integrated into the exhaust system. In this way, for example, the respective exhaust gas aftertreatment element can be brought to an advantageous operating temperature particularly quickly and thus for a particularly short time after a cold start or restart of the internal combustion engine, such that the exhaust gas can then be after-treated particularly well. As a result, a particularly low-emission operation can be guaranteed.

In an advantageous design of the invention, it is provided that the bypass line is fluidically connected to the exhaust system at a branch point arranged upstream of the turbine wheel and upstream of the at least one exhaust gas aftertreatment element, such that by means of the bypass line, at least the part of the exhaust gas at the branch point can be branched off from the exhaust system and introduced into the bypass line, wherein the bypass line is fluidically connected to the exhaust system at a discharge point arranged downstream of the turbine wheel and downstream of the at least one exhaust gas aftertreatment element, such that the exhaust gas flowing through the bypass line can be discharged from the bypass line at the discharge point and can be introduced into the exhaust system.

In an advantageous design of the invention, it is provided that at least one further exhaust gas aftertreatment element for aftertreatment of the exhaust gas in the exhaust system is arranged downstream of the discharge point.

In an advantageous design of the invention, it is provided that the further exhaust gas aftertreatment element has at least one particulate filter.

In an advantageous design of the invention, it is provided that the at least one exhaust gas aftertreatment element has a three-way catalytic converter.

In an advantageous design of the invention, it is provided that the at least one exhaust gas aftertreatment element in the direction of flow of the exhaust gas flowing through the exhaust system is the first exhaust gas aftertreatment element of the internal combustion engine arranged downstream of the combustion chamber in the exhaust system and designed for the aftertreatment of the exhaust gas.

In order to develop a method of the type specified herein in such a way that a particularly low-emission operation can be implemented, it is provided in accordance with the invention that the bypass line also bypasses the at least one exhaust gas aftertreatment element such that the at least one exhaust gas aftertreatment element is also bypassed at least by part of the exhaust gas. A valve element is arranged in the bypass line, by means of which valve element a quantity of the exhaust gas flowing through the bypass line and thereby bypassing the turbine wheel and the at least one exhaust gas aftertreatment element is adjusted. Advantages and advantageous designs of the internal combustion engine according to the invention are to be regarded as advantages and advantageous designs of the method according to the invention and vice versa.

In an advantageous design of the invention, such as upon detection of a future cold start of the internal combustion engine and/or upon detection of a restart of the internal combustion engine following an automatic stop phase, the turbine wheel is rotated by a motor by means of the electric machine for a period of at least substantially or in approximately five seconds in a forward direction of rotation, in which the turbine wheel can be or is driven by the exhaust gas flowing through the exhaust system, in particular in a normal operation, in particular while the internal combustion engine is deactivated, if an external temperature and/or a temperature of a coolant, in particular a cooling liquid, for cooling the internal combustion engine is lower than a predetermined limit value. By way of example, the coolant is water or comprises water, such that the coolant is also referred to as cooling water. Thus in this design, for example, it is provided that, if a cold start of the internal combustion engine occurring in the near future is detected or a restart of the internal combustion engine after a stop phase for external temperatures or cooling water temperatures is less than a predetermined limit value for a period of about 5 seconds, the electric machine is driven by a motor in the forward direction of rotation, whereby the turbine or the turbine wheel is rotated in the forward direction of rotation. In this design, the method is a method for heating the at least one exhaust gas aftertreatment element and/or the aforementioned, possibly provided further exhaust gas aftertreatment element, such that a particularly low-emission operation can be guaranteed.

It has proved to be particularly advantageous if the valve element is opened to the maximum during the method, in particular during heating, i.e., if it is set to about the maximum opening.

It is also conceivable that the turbine wheel is rotated by a motor by means of the electric machine in a reverse direction of rotation opposite to the forward direction of rotation, in particular while the internal combustion engine is deactivated. By rotating the turbine wheel in the forward direction of rotation and/or by rotating the turbine wheel in the reverse direction of rotation while the internal combustion engine is deactivated, exhaust gas is conveyed from the discharge point through the at least one exhaust gas aftertreatment element and through the turbine to the branch point, for example. In the context of the invention, the gas flowing out of the internal combustion engine is referred to as exhaust gas, even if the internal combustion engine is deactivated, since the gas, which circulates promptly after the internal combustion engine has been switched off, is even under this operating condition, an exhaust gas from combustion processes which results from the combustion processes before the internal combustion engine has been switched off. At the branch point, the exhaust gas conveyed from the discharge point to the branch point by means of the turbine wheel can flow into the bypass line and flow via the bypass line from the branch point to the discharge point. At the discharge point, the exhaust gas can flow out of the bypass line and into the exhaust system, also referred to as the exhaust tract, whereupon the exhaust gas is again conveyed by the turbine from the discharge point through the at least one exhaust gas aftertreatment element to the branch point. Thus, by rotating, in particular by motor rotation, the turbine wheel in the reverse or forward direction of rotation, a circulation or recirculation of the exhaust gas can be effected, which in the course of the circulation or recirculation, flows from the branch point through the bypass line to the discharge point and from the discharge point back to the branch point and from there again into the bypass line, such that the exhaust gas circulates in a circle or in a circuit. On its way from the discharge point to the branch point, the exhaust gas flows first through the at least one exhaust gas aftertreatment element and then though the turbine, whereupon the exhaust gas flows to the branch point and from there into the bypass line. In this way, the at least one exhaust gas aftertreatment element is advantageously heated up by the circulating exhaust gas, such that, for example, a particularly advantageous operating temperature of the at least one exhaust gas aftertreatment element can be set particularly quickly. This ensures a particularly low-emission operation. By way of example, the exhaust gas is conveyed and compressed by the turbine wheel. Since the turbine as a compressor, by means of which the exhaust gas is compressed, has an advantageously low efficiency, the exhaust gas is heated up so strongly that the at least one exhaust gas aftertreatment element can be heated up advantageously.

In order to rotate the turbine wheel, in particular in the forward direction of rotation or the reverse direction of rotation, the electric machine is operated in an engine operation, i.e., by a motor and thus as an electric engine. Furthermore, it is conceivable that the electric machine can be operated in a generator mode and thus as a generator or by means of a generator. In the generator mode, the electric machine is driven by the turbine wheel and thus by the exhaust gas driving the turbine wheel, in particular via a shaft. In this way, the electric machine provides electrical energy or electrical current, which can be stored and/or supplied to at least one electrical consumer, in particular directly.

Further advantages, features and details of the invention emerge from the following description of preferred exemplary embodiments and from the drawings. The features and combinations of features mentioned above in the description as well as the features and combinations of features mentioned below in the figure description and/or shown in the figures alone can be used not only in the combination specified in each case, but also in other combinations or on their own without leaving the scope of the invention.

DETAILED DESCRIPTION OF THE DRAWINGS

Figure 1:
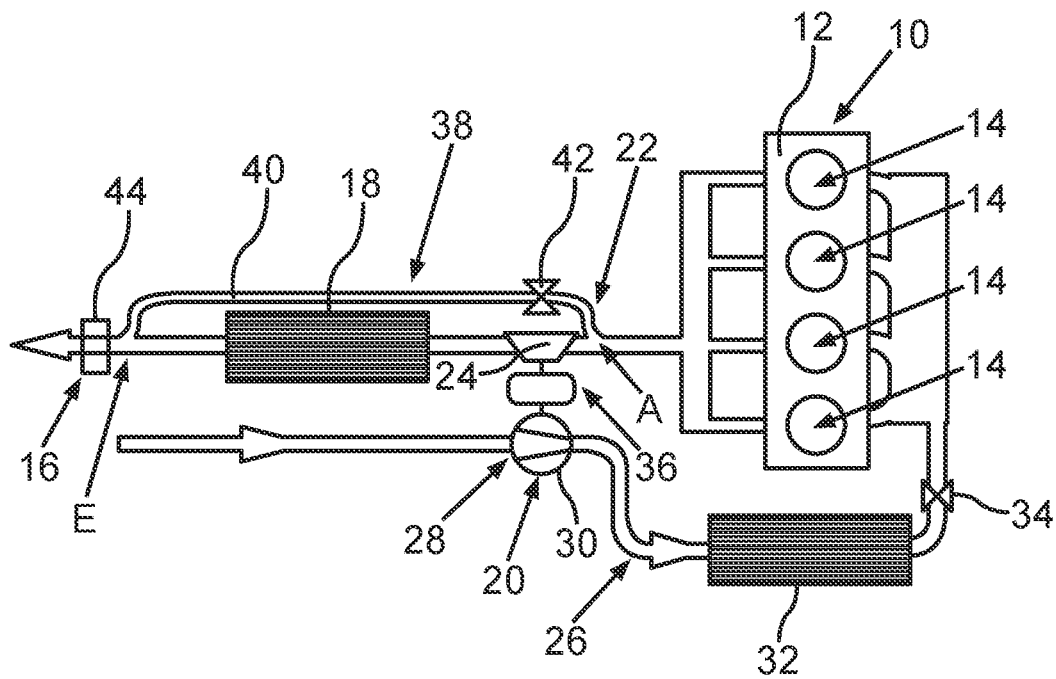
FIG. 1 a schematic depiction of an internal combustion engine according to the invention.

In the figures, identical or functionally identical elements are provided with the same reference numerals.

FIG. 1 shows, in a schematic depiction, an internal combustion engine 10 for a motor vehicle, which is preferably designed as an automobile, in particular a passenger car. The motor vehicle can be driven by means of the internal combustion engine 10. For this purpose, the internal combustion engine 10 comprises a cylinder housing 12, which forms or delimits several combustion chambers, present in the form of cylinders 14. During a fired operation of the internal combustion engine 10, combustion processes take place in the cylinders 14, resulting in exhaust gas from the internal combustion engine 10.

The internal combustion engine 10 has an exhaust system 16 through which the exhaust gas can flow, which is also referred to as the exhaust tract. The internal combustion engine 10 comprises at least one first exhaust gas aftertreatment element 18, which is arranged in the exhaust system 16 and consequently can be flowed through by the exhaust gas. The exhaust gas aftertreatment element 18 is designed as a three-way catalytic converter, for example, or comprises at least or exactly one such three-way catalytic converter. In the direction of flow of the exhaust gas flowing through the exhaust system 16, the exhaust gas aftertreatment element 18 is the first exhaust gas aftertreatment element of the internal combustion engine 10 arranged downstream of the cylinder 14 and designed for the aftertreatment of the exhaust gas. This means that the exhaust gas can be aftertreated by means of the exhaust gas aftertreatment element 18. In addition, the internal combustion engine 10 comprises at least or exactly one exhaust gas turbocharger 20. The exhaust gas turbocharger 20 has a turbine 22 arranged in the exhaust system 16, which has a turbine wheel 24 arranged in the exhaust system 16 and drivable by the exhaust gas flowing through the exhaust system 16.

Furthermore, the exhaust gas turbocharger 20 comprises a compressor 28 arranged in an inlet tract 26 of the internal combustion engine 10. The inlet tract 26, also referred to as the intake tract or air path, can be flowed through by air which is conducted to and into the cylinders 14 by means of the inlet tract 26. Thus the compressor 28 comprises a compressor wheel 30 arranged in the inlet tract 26 and drivable by the turbine wheel 24, by means of which the air flowing through the inlet tract 26 is compressed or can be compressed. For this purpose, the exhaust gas turbocharger 20 comprises, for example, a shaft, to which the turbine wheel 24 and the compressor wheel 30 are or can be coupled. The compressor wheel 30 can be driven by the turbine wheel 24 via the shaft. Since the turbine wheel 24 can be driven or is driven by the exhaust gas, the energy contained in the exhaust gas is used to compress the air. As can be seen in FIG. 1, the exhaust gas aftertreatment element 18 is arranged downstream of the turbine wheel 24 in the direction of flow of the exhaust gas, such that the turbine wheel 24 is arranged upstream of the exhaust gas aftertreatment element 18.

In the direction of flow of the air flowing through the inlet tract 26, a charge air cooler 32 is arranged downstream of the compressor wheel 30 in the inlet tract 26. By compressing the air, this is heated up. In order to still be able to achieve high charging levels, the air heated by the compressor and also referred to as charge air is cooled by means of the charge air cooler 32 before the charge air flows into the cylinders 14. In addition, a throttle valve 34 is arranged in the intake tract 26 downstream of the charge air cooler 32 and upstream of the cylinders 14, by means of which a quantity of the air to be supplied to the cylinders 14 and compressed can be adjusted.

The internal combustion engine 10 also has an electric machine 36, by means of which at least the turbine wheel 24 can be electrically driven. It is also conceivable that the compressor wheel 30 can be driven by means of the electric machine 36. In particular, the turbine wheel 24 and/or the compressor wheel 30 can be driven electrically and thus by means of an electric engine by the electric machine 36 via the aforementioned shaft, in particular in a motor operation of the electric machine 36.

Furthermore, the internal combustion engine 10 comprises a bypass device 38, which has at least or exactly one bypass line 40. The bypass line 40 is fluidically connected to the exhaust system 16 at a branch point A arranged upstream of the turbine wheel 24 and at a discharge point E arranged downstream of the exhaust gas aftertreatment element 18. In this way, at least part of the exhaust gas from the cylinders 14 flowing through the exhaust system 16 can be diverted from the exhaust system 16 by means of the bypass line 40 at the branch point A and fed into the bypass line 40. The branched off exhaust gas flowing into the bypass line 40 flows through the bypass line 40 and thus from the branch point A to the discharge point E. At the discharge point E, the branched off exhaust gas flowing through the bypass line 40 can flow out of the bypass line 40 and flow back into the exhaust system 16. Since the branch point A is arranged upstream of the turbine wheel 24 and the discharge point E is arranged downstream of the turbine wheel 24, the bypass line 40 bypasses the turbine wheel 24. This means that, via the bypass line 40, the turbine wheel 24 can be bypassed at least by the previously mentioned exhaust gas flowing through the bypass line 40. The exhaust gas flowing through the bypass line 40 thus bypasses the turbine wheel 24 and does not drive the turbine wheel 24. The bypass line 40 is also referred to as waste gate, waste gate line, bypass or bypass line. The bypass line 40 also bypasses the at least one exhaust gas aftertreatment element 18. In this way, the at least one exhaust gas aftertreatment element 18 can be bypassed by at least the aforementioned part of the exhaust gas. This means that the discharge point E is not only arranged downstream of the turbine wheel 24, but also downstream of the exhaust gas aftertreatment element 18. The exhaust gas flowing through the bypass line 40 therefore does not flow through the exhaust gas aftertreatment element 18.

The bypass device 38 comprises a valve element 42 arranged in the bypass line 40, by means of which a quantity of the exhaust gas flowing through the bypass line 40 and thereby bypassing the turbine wheel 24 and the exhaust gas aftertreatment element 18 can be adjusted or is adjusted. The valve element 42 is also referred as waste gate or waste gate valve. The exhaust gas flowing through the bypass line 40 is a so-called bypass mass flow, which is not introduced into the exhaust system 16 upstream of the exhaust gas aftertreatment element 18, but only downstream of the exhaust gas aftertreatment element 18. While, for example, the bypass mass flow flows through the bypass line 40, a main exhaust gas flow or main mass flow of the exhaust gas, which is in particular larger than the bypass mass flow, flows through the turbine 22 and through the exhaust gas aftertreatment element 18. At the discharge point E, the bypass mass flow is fed back to the main exhaust gas flow, such that the bypass mass flow and the main exhaust gas flow are then combined into a total flow. The total flow then flows from the discharge point E through the rest of the exhaust system 16 and then, for example, into the environment of the motor vehicle. At least one further exhaust gas aftertreatment element 44 is arranged in the exhaust system 16 downstream of the discharge point E for aftertreatment of the exhaust gas. The total mass flow thus flows through the exhaust gas aftertreatment element 44. The exhaust gas aftertreatment element 44 comprises at least or exactly one particulate filter or is designed as such a particulate filter, for example.

In particular, it is provided that at least the turbine wheel 24 is driven by means of the electric machine 36, while the internal combustion engine 10 is deactivated per se, i.e., while the internal combustion engine 10 is at a standstill. At a standstill, for example, no combustion processes take place in the cylinders 14. While the turbine wheel 24 is driven by means of the electric machine 36, the valve element 42 is at least partially open, preferably at maximum. In particular, the turbine wheel 24 is driven by means of the electric machine 26 and is thus rotated in a forward direction of rotation in which the turbine wheel 24 is driven and thus rotated during normal operation or during fired operation of the internal combustion engine 10, for example. Furthermore, it is conceivable that the turbine wheel 24 is driven by means of the electric machine 36 and thus rotated in a reverse direction of rotation opposite to the forward direction of rotation.

Figure 2:
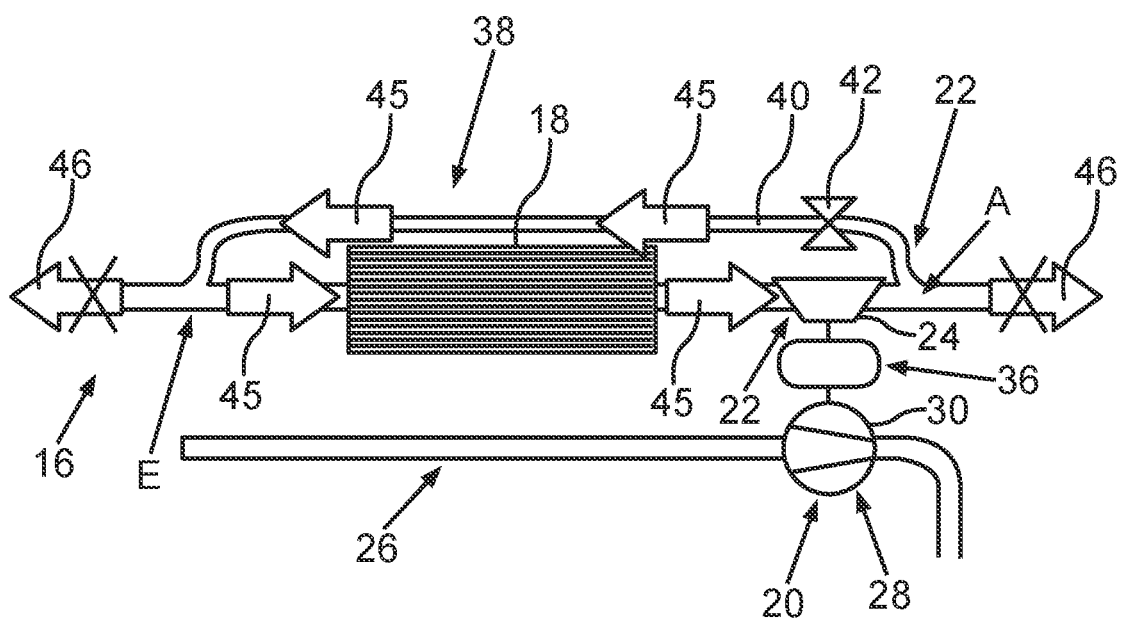
FIG. 2 is a schematic depiction of the internal combustion engine in a recirculation mode.

FIG. 2 shows a circulation mode, also referred to as recirculation mode, of the internal combustion engine 10. During the circulation mode, the internal combustion engine 10 is at a standstill, also referred to as engine standstill, during which no combustion processes take place in the cylinders 14. In the circulation mode, at least the turbine wheel 24—as described above—is driven by means of the electric machine 36 and thus by an engine or electric engine and is thus preferably rotated in the forward direction of rotation while the internal combustion engine 10 is at its engine standstill and while the valve element 42 is at least partially open, in particular at maximum. As a result, the turbine wheel 24 conveys exhaust gas, the flow of which through the exhaust system 16 is illustrated in FIG. 2 by arrows 45 which are not crossed out. As can thus be seen from the arrows 45, a circulating flow of exhaust gas is set, wherein the exhaust gas flows, in the course of its circulating flow, from the branch point A into the bypass line 40, flows through the bypass line 40, flows to the discharge point E, at the discharge point E flows out of the bypass line 40 and into the exhaust system 16, then flows from the discharge point E to the branch point A and from there again into the bypass line 40. On its way from the discharge point E to the branch point A, the circulating exhaust gas flows through the exhaust gas aftertreatment element 18 and then through the turbine 22. In this circulation mode, the turbine 22, in its function as a pump or conveying device for effecting the circulating flow, i.e., for conveying the exhaust gas, has only a poor efficiency, which is advantageous, however, in that the exhaust gas and thus the exhaust gas aftertreatment element 18 can be heated particularly advantageously and particularly quickly. On its way from the discharge point E to the branch point A, the exhaust gas flows through the exhaust system 16 in a first flow direction which is opposite to a second flow direction in which the exhaust gas flows from the branch point A to the discharge point E during fired operation. As illustrated in FIG. 2 by crossed-out arrows 46, it is not possible for the circulating exhaust gas to flow via the exhaust gas aftertreatment element 44 to the surroundings of the motor vehicle, nor is it possible for the exhaust gas to flow to and into the cylinders 14, provided that none of the cylinders of the internal combustion engine is positioned exactly in the charge exchange OT, such that the same exhaust gas is conveyed in a circle by means of the turbine wheel 24, in that the turbine wheel 24 is driven by the electric machine 36 and is preferably rotated in the forward direction of rotation. As a result, the circulating exhaust gas is strongly heated, which heats up the exhaust gas aftertreatment element 18. When one of the cylinders of the internal combustion engine is exactly in the charge exchange OT, the inlet and exhaust valves of this cylinder are open simultaneously. In this case, the exhaust gas would not flow in a circle, but rather would flow through the incorrectly positioned cylinder back to the inlet tract. For the method according to the invention, it must therefore be guaranteed that none of the cylinders of the internal combustion engine is exactly in the charge exchange OT, which can be represented either by suitable switching off of the internal combustion engine or by active positioning of the internal combustion engine with the aid of the starter motor.

Figure 3:
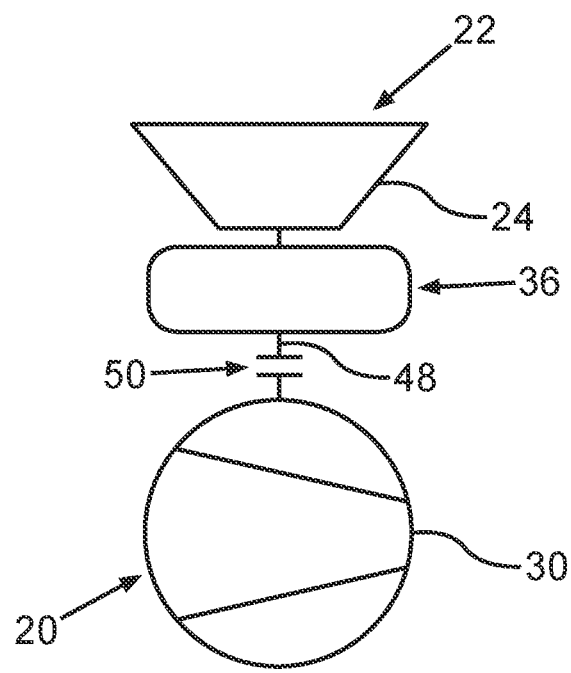
FIG. 3 is a schematic depiction of the internal combustion engine according to a further embodiment.

FIG. 3 shows another embodiment of the internal combustion engine 10. In FIG. 3, the previously mentioned shaft of the exhaust gas turbocharger 20 is designated 48. The turbine wheel 24 is connected to the shaft 48 in a rotationally fixed manner, for example, wherein the shaft 48 and thus the turbine wheel 24 can be driven by the electric machine 36. In particular, it is possible that the turbine wheel 24 is rotated by means of the electric machine 36 in the forward direction of rotation, which is also referred to as the first direction of rotation. A reversal of the direction of rotation of the electric machine 36 is also conceivable. Thus, for example, the electric machine 36 can turn the shaft 48 and thus the turbine wheel 24 in the reverse direction of rotation opposite to the forward direction of rotation, which is also referred to as the second direction of rotation.

A coupling device 50 is provided, for example, which can be designed in particular as a freewheel. In conventional operation, the turbine wheel 24 and the compressor wheel 30 are connected to each other via the coupling device 50 around the shaft 48, in particular connected to each other in a rotationally fixed manner. If the shaft 48 is then driven by the electric machine 36 and rotated, for example, in the forward direction of rotation, both the turbine wheel 24 and the compressor wheel 30 are driven by the electric machine 36 and rotated in the forward direction of rotation. The compressor wheel 30 is thus driven by the coupling device 50, which is designed to be free-wheeling, for example.

In a mode with reverse rotation, the shaft 48 and thus the turbine wheel 24 are rotated in the reverse direction by means of the electric machine 36. In order to avoid undesired driving of the compressor wheel 30, the compressor wheel 30 is decoupled from the shaft 48 and thus from the turbine wheel 24, such that, for example, when the turbine wheel 24 rotates in the reverse direction, the electric machine 36 does not drive and rotate the compressor wheel 30. In other words, the coupling device, which is designed as a coupling element, for example, separates the compressor wheel 30 from the electric machine 36 and from the turbine wheel 24. If the turbine wheel 24 is then driven by the electric machine 36 and rotated in the reverse direction, which allows the exhaust gas aftertreatment element 18 to be heated up advantageously, the compressor wheel 30 is not driven by the electric machine 36 and, for example, the entire engine power provided by the electric machine 36 flows into driving the turbine wheel 24 and thus into heating the exhaust gas in the exhaust system 16.

Figure 4:
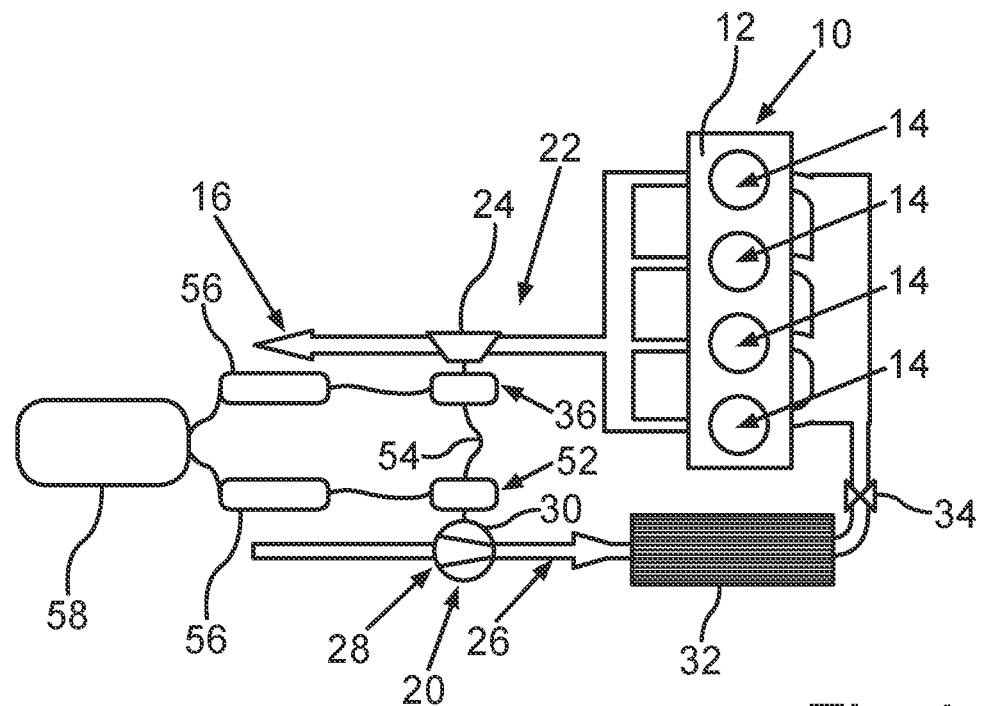
FIG. 4 is a schematic depiction of the internal combustion engine according to a further embodiment.

FIG. 4 shows another embodiment of the internal combustion engine 10. A decoupled, dominantly electric exhaust turbocharger is provided. Here, the electric machine 36 is assigned to the turbine wheel 24, and the compressor wheel 30 is assigned its own, additional electric machine 52, by means of which the turbine wheel 24 can be driven, in particular electrically driven. An electrical shortcut is illustrated by a connection 54 shown schematically in FIG. 4. In the embodiment shown in FIG. 4, the turbine 22 is decoupled from the compressor 28 or vice versa. Nevertheless, an electric motor drive of the turbine wheel 24 in the forward or reverse direction of rotation is possible. In addition, a respective electronic system 56 and a battery 58 are schematically depicted in FIG. 4.

Figure 5:
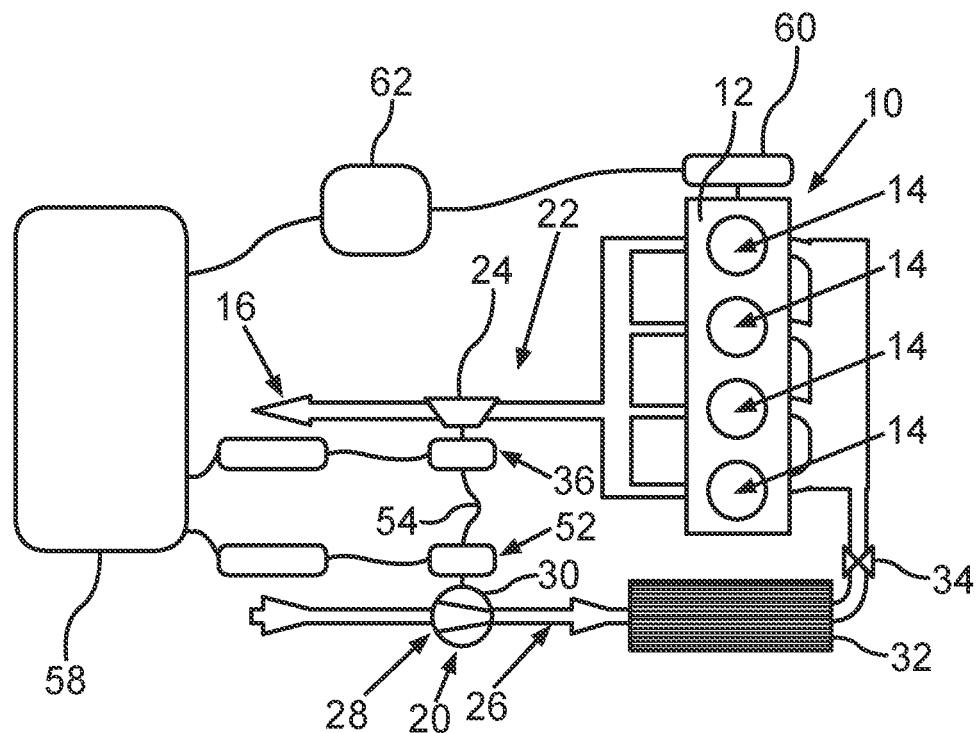
FIG. 5 is a schematic depiction of the internal combustion engine according to a further embodiment.

FIG. 5 shows a further embodiment. An integrated starter generator 60 is provided, which can be supplied with electrical energy stored in a battery 58 via a power electronic system 62, and/or the integrated starter generator 60 can provide electric energy, which can be stored in the battery 58 via the power electronic system 62.

Figure 6:
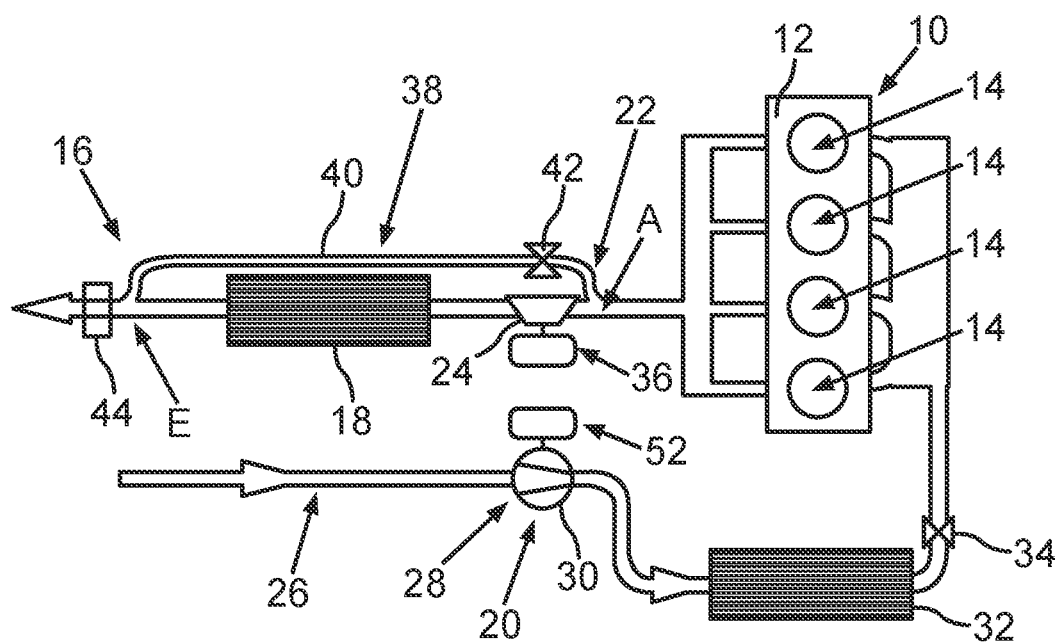
FIG. 6 is a schematic depiction of the internal combustion engine according to a further embodiment

Finally, FIG. 6 shows a further embodiment of the internal combustion engine 10. A decoupling of the turbine 22 from the compressor wheel 30 and vice versa is also provided. Thus, for example, the turbine wheel 24 can be rotated by means of the electric machine 36 in the forward direction of rotation and in the reverse direction of rotation, while the compressor wheel 30 is not driven by a motor.

The invention is based in particular on the following findings: internal combustion engines have increased emission values in the exhaust gas in the first seconds of operation after a cold start, since the components of the exhaust gas aftertreatment have not yet been brought to the temperatures required for chemical exhaust gas purification. Therefore, catalytic converter heating measures are carried out, which are traditionally associated with increased fuel consumption. This leads to major disadvantages, in particular in hybridized powertrains, where the internal combustion engine, also referred to as the combustion engine, undergoes a plurality of starting processes. The exhaust gas turbocharger can be designed as an electrically assisted exhaust gas turbocharger and can be operated even before the internal combustion engine is actually started. If the bypass line 40, also referred to as the waste gate channel, is only fed back into the main exhaust channel downstream of the one or more exhaust aftertreatment components and the waste gate releases this channel during operation of the exhaust gas turbocharger, then the turbine 22 acts as a compressor that sucks in exhaust gas from the exhaust aftertreatment components and conveys it radially outwards. If the charge exchange valves of the internal combustion engine are positioned in such a way that no flow through the cylinders is possible, the exhaust gas conveyed by the turbine 22 has no other choice than to flow through the bypass 40 and then be sucked back through the exhaust aftertreatment components and compressed again by the turbine 22. The exhaust gas and the exhaust aftertreatment components are thus heated in the shortest possible time and immediately clean the exhaust gas that is then produced during normal operation of the internal combustion engine. One problem, however, is that the compressor 28 can rotate in an undesirable way, such that a part of the introduced electrical power is used to heat the air, also referred to as intake air. This can be avoided by decoupling the compressor 28 from the turbine 22 in the manner described above. For this purpose, for example, the coupling device 50 is designed as a carrying clutch, coupling member or freewheel which drives the compressor wheel 30 in only one of the directions of rotation, such that the turbine wheel 24 and the compressor wheel 30 can be rotated together in one direction by the electric machine 36. However, the turbine wheel 24 can be rotated relative to the compressor wheel 30 in the other direction of rotation opposite to the one direction of rotation, and the compressor wheel 30 is not driven if the turbine wheel 24 is rotated in the other direction of rotation. The other direction of rotation is, for example, forward rotation or reverse rotation. In this way, the turbine 22 can perform the desired heating function while the compressor 28 does not consume any power. The entire engine power of the electric machine 36 then flows into the compression and delivery of the exhaust gas in the recirculation mode. In conventional operation or during fired operation of the internal combustion engine 10, the coupling device 50 is closed, such that there is a mechanical connection between the turbine 22, the compressor 28 and the electric machine 36, which is designed as an electric engine, for example. If necessary, it is advantageous to adapt the blading of the turbine 22 to the particular conditions of reverse rotation.

Furthermore, according to FIGS. 5 to 6, it is provided to divide the electrically supported exhaust gas turbocharger 20 into two completely separate components, wherein a first of the components comprises the turbine 22, having the turbine wheel 24, and the electric machine 36, while the other component comprises the compressor 28, having the compressor wheel 30, and the electric machine 52. Each component receives its own drive shaft, via which the turbine wheel 24 and the compressor wheel 30 can be driven by the respective electric machine 36 or 52. The respective electric machine 36 or 52 can be operated in generator mode as well as in an engine mode. Then the turbine 22 can perform the desired heating function, while the compressor 28 does not consume any power. The entire engine power provided by the electric machine 36 then flows into the compression and delivery of the exhaust gas in the recirculation mode.

Overall, it can be seen that the exhaust gas turbocharger 20 is designed as an electrically supported exhaust gas turbocharger. Preferably, the recirculation operation is carried out before the actual engine start of the internal combustion engine 10, such that, for example, the electric machine 36 is already operated before the actual engine start.

The exhaust gas turbocharger 20 is preferably capable of running without oil pressure, since the exhaust gas turbocharger 20 is operated while the internal combustion engine 10 is at a standstill. Preferably, the compressor side is relieved in some way, for example by a flap upstream that does not allow mass flow, a separate recirculation channel that does not allow pressure build-up, or some kind of blow-off device. The system is also suitable for multi-stage charged concepts, as long as the exhaust gas aftertreatment elements to be heated are incorporated in the recirculation circuit. It is also advantageous to operate the exhaust gas turbocharger 20 in the opposite direction to the conventional forward direction of rotation and thus to rotate in the reverse direction of rotation, as this results in better thermodynamic conditions for introducing electrical power into the recirculation circuit.

If the exhaust gas turbocharger 20 is separated into the completely separate components described above, for example, the respective mechanical shaft of the exhaust gas turbocharger 20 is replaced by a chain of generator, power electronics, battery, power electronics and electric machine. In favorable cases, it is possible to forgo intermediate storage of the electrical energy in the battery and choose the most efficient route from the turbine directly to the compressor. It is also conceivable to connect the entire system to an existing electrical vehicle system. In this case, purely electrical compression is possible by feeding from the combustion side or at the expense of the battery charge level. Conversely, purely electrical decompression in the turbine is conceivable for charging the battery or for driving the crankshaft or the vehicle. In hybridized powertrains, any power flows are conceivable. By way of example, when driving downhill, the battery can be charged simultaneously via the drive wheels and the turbine, while the compressor simultaneously conditions the gas state in the intake tract. In the throttled combustion mode, the compressor can take over part or all of the throttling and be operated as a turbine. It is also conceivable that the two units, compressor and turbine, could be used independently of the combustion process, i.e., even when the combustion process is at a standstill, for example to condition the gas state in the intake or exhaust tract, or to heat or cool or supply engine components or components outside the engine.

REFERENCE CHARACTER LIST 10 internal combustion engine
12 cylinder housing
14 cylinder
16 exhaust system
18 exhaust gas aftertreatment element
20 exhaust gas turbocharger
22 turbine
24 turbine wheel
26 inlet tract
28 compressor
30 compressor wheel
32 charge air cooler
34 throttle valve
36 electric machine
38 bypass device
40 bypass line
42 valve element
44 exhaust gas aftertreatment element
45 arrow
46 arrow
48 shaft
50 coupling device
52 electric machine
54 connection
56 electronics
58 battery
60 integrated Stator Generator
62 power electronics
A branch point
E discharge point

The invention claimed is:

1. An internal combustion engine (10) for a motor vehicle, comprising:
an exhaust system (16) through which exhaust gas from the internal combustion engine (10) can flow and in which a first exhaust gas aftertreatment element (18) for after-treating the exhaust gas is disposed;
an exhaust gas turbocharger (20) which has a turbine (22) and a compressor (28) is disposed in the exhaust system (16), wherein the turbine (22) has a turbine wheel (24) which can be driven by the exhaust gas and is disposed upstream of the first exhaust gas aftertreatment element (18) and wherein the compressor (28) has a compressor wheel (30) which can be driven by the turbine wheel (24) for compressing air to be supplied to a combustion chamber (14) of the internal combustion engine (10);
an electric machine (36) via which at least the turbine wheel (24) can be electrically driven in a forward direction of rotation or a reverse direction of rotation;
a coupling element (50) that connects the turbine wheel (24) and the compressor wheel (30) while the turbine wheel (24) is electrically driven in the forward direction of rotation, and disconnects the turbine wheel (24) from the compressor wheel (30) while the turbine wheel (24) is electrically driven in the reverse direction of rotation; and
a bypass device (38) which has a bypass line (40) which bypasses the turbine wheel (24) and via which at least part of the exhaust gas can bypass the turbine wheel (24);
wherein the bypass line (40) also bypasses the first exhaust gas aftertreatment element (18) such that the first exhaust gas aftertreatment element (18) can also be bypassed by the at least part of the exhaust gas;
wherein a valve element (42) is disposed in the bypass line (40) via which a quantity of the exhaust gas flowing through the bypass line (40) and thereby bypassing the turbine wheel (24) and the first exhaust gas aftertreatment element (18) can be adjusted;
wherein the bypass line (40) is fluidically connected to the exhaust system (16) at a branch point (A) disposed upstream of the turbine wheel (24) and upstream of the first exhaust gas aftertreatment element (18) such that via the bypass line (40) the at least part of the exhaust gas at the branch point (A) can be branched off from the exhaust system (16) and introduced into the bypass line (40);
wherein the bypass line (40) is fluidically connected to the exhaust system (16) at a discharge point (E) disposed downstream of the turbine wheel (24) and downstream of the first exhaust gas aftertreatment element (18) such that the at least part of the exhaust gas flowing through bypass line (40) can be discharged from the bypass line (40) at the discharge point (E) and introduced into the exhaust system (16);
wherein downstream of the discharge point (E) a second exhaust gas aftertreatment element (44) is disposed in the exhaust system (16) for after-treating the exhaust gas.

2. The internal combustion engine according to claim 1, wherein the second exhaust gas aftertreatment element (44) has at least one particulate filter.

3. The internal combustion engine (10) according to claim 1, wherein the first exhaust gas aftertreatment element (18) has a three-way catalytic converter.

4. The internal combustion engine (10) according to claim 1, wherein the first exhaust gas aftertreatment element (18) is a first exhaust gas aftertreatment element of the internal combustion engine disposed downstream of the combustion chamber (14) and is configured for aftertreatment of the exhaust gas in a direction of flow of the exhaust gas flowing through the exhaust system.

5. A method for operating an internal combustion engine (10), wherein the internal combustion engine comprises:
an exhaust system (16) through which exhaust gas from the internal combustion engine (10) can flow and in which a first exhaust gas aftertreatment element (18) for after-treating the exhaust gas is disposed;

an exhaust gas turbocharger (20) which has a turbine (22) and a compressor (28) is disposed in the exhaust system (16), wherein the turbine (22) has a turbine wheel (24) which can be driven by the exhaust gas and is disposed upstream of the first exhaust gas aftertreatment element (18) and wherein the compressor (28) has a compressor wheel (30) which can be driven by the turbine wheel (24) for compressing air to be supplied to a combustion chamber (14) of the internal combustion engine (10);

an electric machine (36) via which at least the turbine wheel (24) can be electrically driven in a forward direction of rotation or a reverse direction of rotation; and a bypass device (38) which has a bypass line (40) which bypasses the turbine wheel (24) and via which at least part of the exhaust gas can bypass the turbine wheel (24);

wherein the bypass line (40) also bypasses the first exhaust gas aftertreatment element (18) such that the first exhaust gas aftertreatment element (18) can also be bypassed by the at least part of the exhaust gas;

wherein a valve element (42) is disposed in the bypass line (40) via which a quantity of the exhaust gas flowing through the bypass line (40) and thereby bypassing the turbine wheel (24) and the first exhaust gas aftertreatment element (18) can be adjusted;

wherein the bypass line (40) is fluidically connected to the exhaust system (16) at a branch point (A) disposed upstream of the turbine wheel (24) and upstream of the first exhaust gas aftertreatment element (18) such that via the bypass line (40) the at least part of the exhaust gas at the branch point (A) can be branched off from the exhaust system (16) and introduced into the bypass line (40);

wherein the bypass line (40) is fluidically connected to the exhaust system (16) at a discharge point (E) disposed downstream of the turbine wheel (24) and downstream of the first exhaust gas aftertreatment element (18) such that the at least part of the exhaust gas flowing through bypass line (40) can be discharged from the bypass line (40) at the discharge point (E) and introduced into the exhaust system (16);

and comprising the steps of:

upon detection of a future cold start of the internal combustion engine (10) or upon detection of a restart of the internal combustion engine (10) following an automatic stop phase, a circulating flow of exhaust gas generated by the turbine wheel (24) is set by the electric machine (36) and flows into the bypass line (40) from the branch point (A), flows through the bypass line (40), flows to the discharge point (E), flows out of the bypass line (40) at the discharge point (E) and flows into the exhaust system (16), and then flows from the discharge point (E) to the branch point (A) and from the branch point (A) flows back into the bypass line (40).

6. The method according to claim 5, wherein the valve element (42) is opened to a maximum extent.

7. The method according to claim 5, wherein the turbine wheel (24) is motorically rotated for a period of at least substantially five seconds.

8. The method according to claim 5, wherein the turbine wheel (24) is rotated if an outside temperature and/or a temperature of a cooling medium for cooling the internal combustion engine (10) is lower than a predetermined limit value.

* * * * *